(12) United States Patent
Goehnermeier et al.

(10) Patent No.: US 9,826,201 B2
(45) Date of Patent: Nov. 21, 2017

(54) METHOD AND MEASURING MACHINE FOR DETERMINING DIMENSIONAL PROPERTIES OF A MEASUREMENT OBJECT

(71) Applicant: Carl Zeiss Industrielle Messtechnik GmbH, Oberkochen (DE)

(72) Inventors: Aksel Goehnermeier, Essingen-Lauterburg (DE); Philipp Jester, Heidenheim (DE); Frank Widulle, Neu-Ulm (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/221,879

(22) Filed: Jul. 28, 2016

(65) Prior Publication Data
US 2017/0032540 A1 Feb. 2, 2017

(30) Foreign Application Priority Data
Jul. 31, 2015 (DE) .......................... 10 2015 112 651

(51) Int. Cl.
*G06T 7/00* (2017.01)
*G06T 7/60* (2017.01)
(Continued)

(52) U.S. Cl.
CPC ............. *H04N 7/183* (2013.01); *G01B 11/24* (2013.01)

(58) Field of Classification Search
USPC ......................................................... 348/135
See application file for complete search history.

(56) References Cited

U.S. PATENT DOCUMENTS

| | | | | |
|---|---|---|---|---|
| 5,003,615 A | * | 3/1991 | Seitz .................... | G01B 11/306 348/128 |
| 5,811,754 A | * | 9/1998 | Nakatani ................ | B23K 26/04 219/121.7 |

(Continued)

FOREIGN PATENT DOCUMENTS

DE 198 05 040 A1 8/1999

*Primary Examiner* — Mohammed Rahaman
*Assistant Examiner* — Asmamaw G Tarko
(74) *Attorney, Agent, or Firm* — Harness, Dickey & Pierce, P.L.C.

(57) ABSTRACT

A method and a measuring machine for determining dimensional properties of a measurement object each use a workpiece table and a camera having an image sensor and an imaging optics. The imaging optics exhibits aberrations and is configured to be focused on a plurality of different working positions relative to the workpiece table. The aberrations are minimized by using first calibration values provided for a defined working position. A first working distance of the camera relative to a region of interest is determined. Subsequently, the imaging optics is focused, using the first working distance and using second calibration values that represent an image field curvature of the camera, such that the region of interest is substantially brought into a defined working position. Subsequently, the image recording and image evaluation take place to determine measurement values that represent the dimensional properties of the measurement object in the region of interest.

15 Claims, 3 Drawing Sheets

(51) Int. Cl.
*H04N 7/18* (2006.01)
*G01B 11/24* (2006.01)

(56) References Cited

U.S. PATENT DOCUMENTS

| | | | | |
|---|---|---|---|---|
| 6,538,691 B1* | 3/2003 | Macy | ............... | H04N 3/2335 348/222.1 |
| 7,400,412 B2* | 7/2008 | Christoph | ............ | G01B 11/005 356/601 |
| 2005/0151839 A1* | 7/2005 | Ito | ............... | G06T 15/04 348/51 |
| 2008/0114485 A1* | 5/2008 | Katoh | ............... | G05B 19/404 700/193 |
| 2009/0088999 A1* | 4/2009 | Bryll | ............... | G01B 21/045 702/86 |
| 2010/0225666 A1* | 9/2010 | Beauchemin | ...... | G06K 9/00476 345/629 |
| 2014/0043469 A1* | 2/2014 | Engel | ............... | G01N 21/88 348/135 |

* cited by examiner

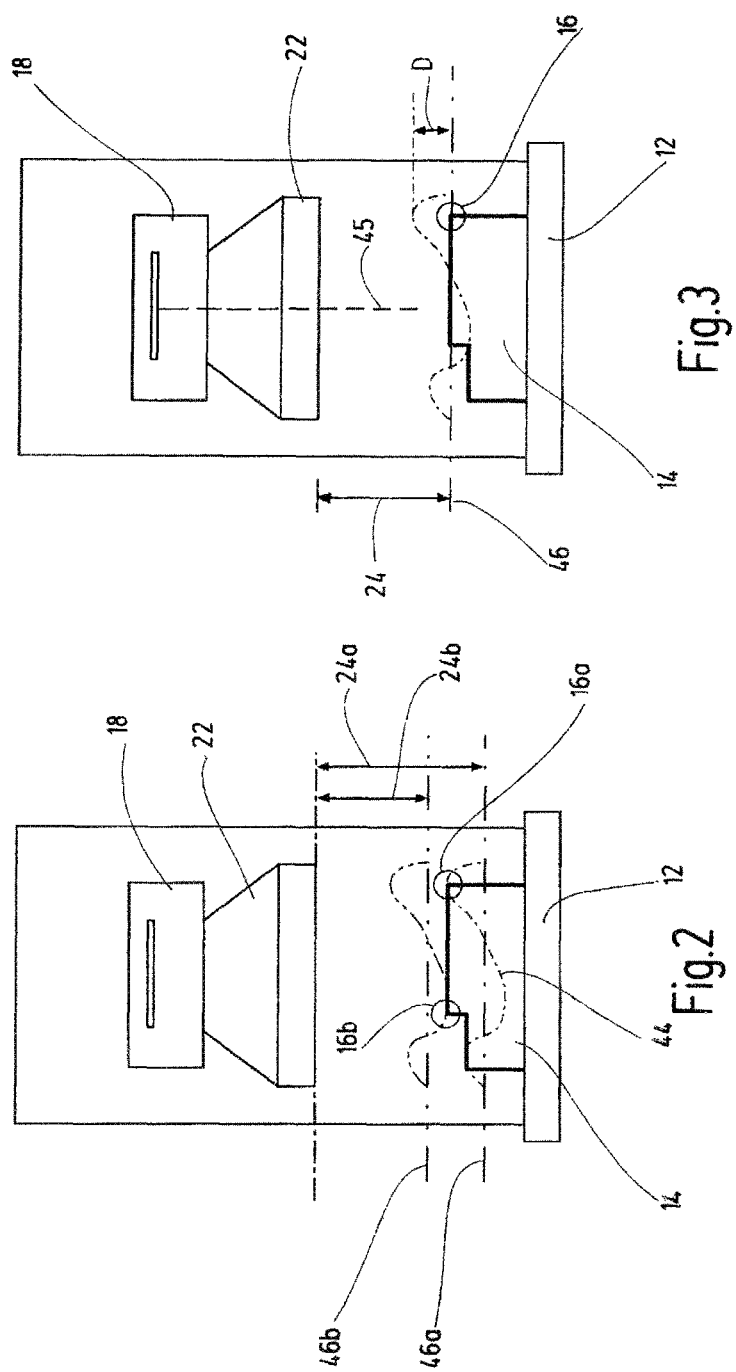

METHOD AND MEASURING MACHINE FOR DETERMINING DIMENSIONAL PROPERTIES OF A MEASUREMENT OBJECT

CROSS-REFERENCES TO RELATED APPLICATIONS

This application claims priority from German patent application DE 10 2015 112 651.6 filed on Jul. 31, 2015. The entire content of this priority application is incorporated herein by reference.

BACKGROUND OF THE INVENTION

The present invention relates to a method and to a corresponding measuring machine for determining dimensional properties of a measurement object. In particular, the invention relates to a method for measuring a measurement object using what is known as a profile projector, i.e. using a measuring machine that provides a 2D image of the measurement object on a display in order to measure, for example, the position and/or the profile of an object edge.

DE 198 05 040 A1 discloses a prior art measuring machine having a workpiece table for supporting a measurement object and having a camera that is arranged above the workpiece table and is displaceable vertically. Arranged below the workpiece table is a light source that illuminates the measurement object in what is known as transmitted light. The image recorded by the camera consequently shows the measurement object as a silhouette. However, more specific details of the measurement method are not described therein.

One example of a digital profile projector is disclosed by US 2010/0225666 A1. This profile projector generates a digital image of a measurement object, and a drawing of the measurement object is superimposed onto the image on a display so as to be able to check whether the measurement object corresponds to the drawing within predetermined workpiece tolerances.

The imaging objects of a real optical system and, consequently, also the camera of a real optical measuring machine are known to always exhibit aberrations that can be traced back in part to manufacturing tolerances and in part to trade-offs during the optical design and/or to underlying physical phenomena. The aberrations represent the deviation of the real imaging optics from an ideal optical image that is possible only in theory. Typical aberrations include spherical aberration, astigmatism, coma, image field curvature (other term: focal plane deviation—FPD) and distortion. For increasing the measurement accuracy of an optical measuring machine, the aberrations in the image recorded by the imaging optics can be corrected by way of computation before, during or after the actual image evaluation, wherein calibration values obtained in a previous calibration operation are used. U.S. Pat. No. 6,538,691 B1, for example, describes a computer-implemented correction of image distortions of a digital camera.

The known methods and measuring machines and the calibration methods used therein are not yet optimal, especially in cases where the imaging optics can be adjusted to different working distances relative to a workpiece table. The aberrations are frequently minimized in optimum fashion only for a specific working distance.

SUMMARY OF THE INVENTION

In view of this background, it is an object of the present invention to provide a method and a measuring machine of the type mentioned in the introductory portion, which permit efficient measurement of a measurement object in terms of measurement time and costs and a high degree of measurement accuracy.

According to a first aspect of the invention, there is provided a method for determining dimensional properties of a measurement object, comprising the steps of: providing an optical measuring machine comprising a workpiece table and a camera having an image sensor and an imaging optics, wherein the imaging optics exhibits aberrations and is configured to be focused on a plurality of different working positions relative to the workpiece table; providing first calibration values that are selected such that the aberrations are minimized for a defined working position from the plurality of different working positions; providing second calibration values that represent an image field curvature of the camera; positioning the measurement object on the workpiece table; defining a first region of interest on the measurement object; determining a first working distance of the camera to the first region of interest; focusing the imaging optics using the first working distance and the second calibration values such that the first region of interest is substantially brought into the defined working position; recording an image of the first region of interest while it substantially is in the defined working position; and determining measurement values that represent the dimensional properties of the measurement object in the first region of interest on the basis of the image and on the basis of the first calibration values.

According to another aspect of the invention, there is provided a measuring machine for determining dimensional properties of a measurement object, comprising a workpiece table; a camera having an image sensor and an imaging optics, wherein the imaging optics exhibits aberrations and is configured to be focused on a plurality of different working positions relative to the workpiece table; a first memory for providing first calibration values that are selected such that the aberrations are minimized for a defined working position from the plurality of different working positions; a second memory for providing second calibration values that represent an image field curvature of the camera; and an evaluation and control unit having an interface for defining a first region of interest on the measurement object; wherein the evaluation and control unit is configured for:

a) determining a first working distance of the camera to the first region of interest, b) focusing the imaging optics using the first working distance and using the second calibration values such that the first region of interest is brought into the defined working position, c) recording an image of the first region of interest while it is on the defined working position using the camera, and d) determining measurement values that represent the dimensional properties of the measurement object in the first region of interest on the basis of the image and on the basis of the first calibration values.

The novel method and measuring machine utilize first calibration values that are selected such that the aberrations, in particular the individual aberrations of the imaging optics, for a defined working position from the plurality of possible working positions are minimized according to a predefined quality criterion. In other words, the novel method and measuring machine require a calibration that permits the correction of aberrations of the optics by way of computation, for example before the measurement values for the measurement object are determined on the basis of the corrected image or even afterwards. In particular, the first calibration values are selected such that the distortion of the imaging optics for exactly one defined working distance or one defined working position is minimized.

The calibration with respect to a defined working position from the plurality of different possible working positions provides an optimum working position, i.e. an optimum measurement plane in front of the imaging optics, which optimum working position allows measurement results having maximum measurement accuracy due to the calibration and the resulting correction. This measurement plane at the one defined working position constitutes, to a certain extent, the "best measurement plane". However, for other working positions from the plurality of possible working positions, the measurement errors can be greater, in particular if no separate calibration was carried out for the further working positions and consequently no first calibration values that are dependent on the working position are available.

For this reason, the novel method and measuring machine include, in addition to the provision of the first calibration values or the provision of a "best measurement plane", the feature that a region of interest (also referred to as ROI) to be measured on the measurement object is brought as close as possible to the "best measurement plane" by way of selected focusing of the imaging optics. This is important because due to the image field curvature, the exact focus position can be dependent on the lateral position of the first region of interest. By way of example, due to the image field curvature, the upper right-hand corner of a measurement object may optimally be located in the focus of the imaging optics, while at the same time the bottom left-hand corner of the same measurement object may be located outside of the optimum focus.

The novel method and measuring machine are based on the idea of determining the local focus of a region of interest on the measurement object, which is dependent on the image field curvature, in particular meteorologically using a first focusing step. In other words, the first region of interest in this case is brought into the (laterally spatially dependent) focus of the imaging optics as optimally as possible using a first focus measurement. Subsequently, however, the imaging optics is selectively refocused or defocused with respect to the first region of interest in order to bring the first region of interest as close as possible to or into the defined working position, which represents a best measurement plane due to the first calibration values and the image correction that is based thereon. The first region of interest is thus brought into the first measurement plane or at least as close as possible to the best measurement plane in a targeted fashion. Here, the novel method and measuring machine accept that the first region of interest may not be located in the optimum focus for the recording of the measurement image. In practical cases this means that the focusing of the camera can vary depending on the lateral position of the first region of interest, even if the measurement object laterally has no height variation. If the first region of interest is located, for example, at the upper right corner of the measurement object, the focusing of the camera in the novel method and measuring machine can be different than that in the case where the first region of interest is selected to be at the bottom right corner of the measurement object. However, in both cases the measurement plane that is best on the basis of the calibration is brought into or to the region of interest to be measured in a targeted fashion.

The novel method and measuring machine therefore accept local defocusing with respect to the region of interest in order to bring the region of interest as close as possible to or even into the best measurement plane that is obtained from the calibration of the imaging optics for a defined working position.

The selective "misfocusing" of the imaging optics with respect to the region of interest to be measured is carried out using the second calibration values that just represent the image field curvature, i.e. the laterally spatially dependent focus of the imaging optics. In other words, the second calibration values thus represent a laterally spatially dependent distance (along the optical axis or in the focal direction) between the optimum focal position for a region of interest and the measurement plane that is best on the basis of the calibration.

In some exemplary embodiments, the second calibration values can be determined by recording a dot-matrix having a plurality of dots, which are distributed in the manner of a matrix, at the one defined working position, which represents the best measurement plane due to the calibration. Some of the dots in the dot matrix may be represented sharply in the recorded image, because they are in optimum focus in the calibrated working position. However, other dots may be imaged less sharply or even entirely unsharply due to the image field curvature. If the working position of the camera is changed in order to image the dots, which are initially imaged unsharply, as sharply as possible, i.e. to bring them into the laterally spatially dependent focus, the change in the working position represents the laterally spatially dependent distance of the optimum focal position from the best measurement plane for the observed region of interest. It is exactly this information that is represented in the second calibration values and corresponds to the image field curvature that is utilized in the novel method and measuring machine to position a region of interest as optimally as possible in or on the calibrated best measurement plane before the measurement image is recorded.

Recording the second calibration values can be part of the novel method. However, it can also take place before the novel method, since all that is required for the novel method and measuring machine is to use the laterally spatially dependent distances of the optimum focus from the best measurement plane for adjusting the working position before the image recording.

The novel method and measuring machine permit the measurement of a measurement object with a high degree of measurement accuracy since the individual region of interest on the measurement object is positioned optimally at the best measurement plane in dependence on the lateral position thereof and in dependence on the individual image field curvature of the camera. In preferred exemplary embodiments, the novel method and measuring machine record only one image of the measurement object after the measurement object was brought into an optimum working position according to the novel method. The novel method and measuring machine therefore permit a relatively quick measurement. The setting of the final working position before the image recording, i.e. focusing of the imaging optics, can also be found quickly on the basis of the known, but laterally spatially dependent focal position.

Moreover, the novel method and measuring machine make it possible to operate with one set of first calibration values for exactly one defined working position. As a result, the novel method and measuring machine need no more than a relatively small set of first calibration values.

Finally, it suffices for the optical design of the imaging optics to be optimized to one of a plurality of possible working positions, possibly with the aid of the first calibration values, because the novel method and measuring machine ensure, despite the plurality of possible working positions, that a region of interest on the measurement object is in each case positioned such that maximum measurement accuracy is achieved.

Overall, the novel method and measuring machine therefore permit a measurement that is efficient in terms of time and costs and offers a high degree of measurement accuracy.

In a preferred refinement of the invention, the first calibration values effect a correction of distortion errors of the imaging optics at the defined working position, in particular a correction of focus-dependent distortion errors.

Distortion errors negatively affect the measurement accuracy of an optical measuring machine particularly strongly since they can influence the position of edges and other features of the measurement object in the recorded image. The correction of distortion errors with the aid of the calibration values therefore contributes particularly advantageously to a high degree of measurement accuracy. This refinement benefits here to a particular degree from the advantages of the novel method and measuring machine, since the correction of the distortion errors and the calibration necessary therefor can be limited to a "best measurement plane".

In a further refinement, the imaging optics is initially focused on the first region of interest to determine the working distance.

In this refinement, the first working distance is instantaneously determined with the aid of a first focus measurement. The subsequent (re-)focusing of the imaging optics such that the first region of interest is brought to the defined working position thus corresponds to a targeted defocusing. The refinement permits a very simple and exact determination of the first working distance, in particular in the case of measurement objects having largely unknown properties and/or large tolerances. Alternatively or additionally, the first working distance can also be determined on the basis of CAD data and a calibration of the measurement device to a reference point or a reference plane, such as for example the workpiece table surface.

In a further refinement of the invention, a second region of interest on the measurement object is defined, which second region of interest is laterally spaced apart from the first region of interest, and the imaging optics is focused using the second calibration values such that the first region of interest and the second region of interest each are brought as close as possible to the defined working position (or the "best measurement plane").

In some exemplary embodiments, the best measurement plane may be positioned centrally between the first and second regions of interest (with respect to the focal direction or parallel to the optical axis of the imaging optics). In other exemplary embodiments, a weighted criterion may be used in which, for example, the size or the size ratio between the first and second regions of interest is taken into consideration to bring the best measurement plane as optimally as possible to the two relevant regions of interest. In particularly preferred exemplary embodiments, only one image of the measurement object is recorded, corrected and evaluated, wherein the measurement values for the first and for the second region of interest are determined on the basis of the one image. The refinement permits particularly fast measurement with a high degree of measurement accuracy even if the first and the second region of interest are laterally spaced apart by some distance from one another and/or are imaged in the one image with varying sharpness due to an individual strong image field curvature.

In a further refinement, the imaging optics is further focused onto the second region of interest to determine a second working distance, and the imaging optics is focused, using the first working distance, the second working distance and the second calibration values, to bring the first region of interest and the second region of interest each as close as possible to the defined working position.

In this refinement, the second working distance is individually measured with respect to the second region of interest and the best measurement plane is placed in dependence thereon and taking into consideration the first measured working distance. This configuration allows a particularly high degree of measurement accuracy over a plurality of regions of interest of an extended measurement object. Alternatively or additionally, it is conceivable in principle to determine the second working distance, for example, only on the basis of CAD data, after the first working distance was measured or otherwise determined.

In a further refinement, the first region of interest and the second region of interest border one another and form segments of a common region of interest.

In this refinement, a common "large" region of interest is divided into two or more segments, and the imaging optics is focused as optimally as possible with respect to the individual segments. This refinement permits measurement of large-area regions of interest with optimum measurement accuracy.

In a further refinement, a CAD data set is made available, which CAD data set represents nominal dimensional properties of the measurement object, wherein the first and/or second working distance is determined on the basis of the CAD data set.

In this refinement, the novel method and measuring machine utilize nominal data of the measurement object to place the best measurement plane as optimally as possible with respect to the first and/or the second region of interest. The refinement makes it possible to dispense with an individual measurement of the working distance so as to accelerate the measurement. However, this refinement is also advantageous in combination with an individual measurement of the first and/or second working distance, since the search region for the measurement of the first and/or second working distance can be reduced on the basis of the CAD data, which likewise permits a faster measurement.

In a further refinement, a further region of interest on the measurement object is defined, wherein a further image of the measurement object is recorded, after the further region of interest has been brought to the defined working position using the second calibration values. Advantageously, a further working distance to the further region of interest is measured by way of focusing on the further region, before the imaging optics is refocused, using the further working distance and the second calibration values, to bring the further region of interest as close as possible to the defined working position.

In this refinement, the further region of interest is measured with a different placement of the best measurement plane (in the focal direction) than the first and/or second region of interest. The refinement requires further focusing of the imaging optics, and therefore appears to be disadvantageous as regards the measurement time. However, it permits optimum measurement of different regions of interest which are laterally spaced apart from one another.

In a further refinement, an area centroid of the first region of interest is determined, and the first working distance relative to the area centroid is determined.

In this refinement, refocusing of the imaging optics and the resulting placement of the best measurement plane at or in the region of the first region of interest are effected with respect to the area centroid of this region of interest. The refinement permits a reproducible measurement accuracy especially with respect to large-area regions of interest, and is therefore advantageous.

In a further refinement, the first calibration values furthermore include distance-dependent correction values for correcting telecentricity errors and/or coma, wherein the measurement values are determined in dependence on the first working distance and the distance-dependent correction values.

In this refinement, the novel method and measuring machine permit a measurement accuracy that is increased even further by individually correcting aberrations of the imaging optics in dependence on the distance of the region of interest to be measured from the imaging optics. The distance-dependent correction is possible relatively easily on account of the known spatially dependent focal position of the first region of interest and the distance of the focal position from the best measurement plane.

In a further refinement, a surface topography of the measurement object is determined in dependence on the second calibration values.

In this refinement, the novel method and measuring machine provide 3D position information of measurement features on the measurement object, which can be used advantageously for measuring flat, but not level measurement objects. The "height information" can be determined very easily and cost effectively on the basis of the second calibration values that represent a laterally spatially dependent focus of the imaging optics.

In a further refinement, the second calibration values are provided in the form of a value table, wherein each value in the value table represents a spatially dependent focus shift.

The spatially dependent focus shift can advantageously relate to the best measurement plane, such that each value in the value table represents a distance, dependent on the lateral position, perpendicularly to the best measurement plane. The provision of the second calibration values in the form of a value table is very simple and cost-effective, in that, for example, the spatially dependent focal points are determined on the basis of a dot matrix which is recorded by the imaging optics.

In a further refinement, the second calibration values are provided in the form of coefficients of a spatially dependent polynomial, in particular what is known as a Zernike polynomial.

This refinement permits a higher degree of measurement accuracy at "intermediate positions" which are not directly captured during the recording of the second calibration values. Moreover, this refinement is advantageous if the imaging optics laterally captures a very large area, since in this case the memory requirement for the provision of the second calibration values can be kept small.

In a further refinement, the second calibration values further include orientation-dependent contributions of the image field curvature, which result from astigmatic aberrations.

In this refinement, the edge position of a measurement object in the region of interest is advantageously taken into account. With this refinement, measurement errors that can occur as a result of astigmatism of the imaging optics are minimized very efficiently. The measurement accuracy is increased even further.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Exemplary embodiments of the invention are illustrated in the drawing and are explained in greater detail in the following description.

FIG. 2 shows the measuring machine of FIG. 1 with an illustration of two different working positions with respect to a measurement object, FIG. 3 shows the measuring machine of FIG. 2 with a second working position.

DESCRIPTION OF PREFERRED EMBODIMENTS

Figure 1:
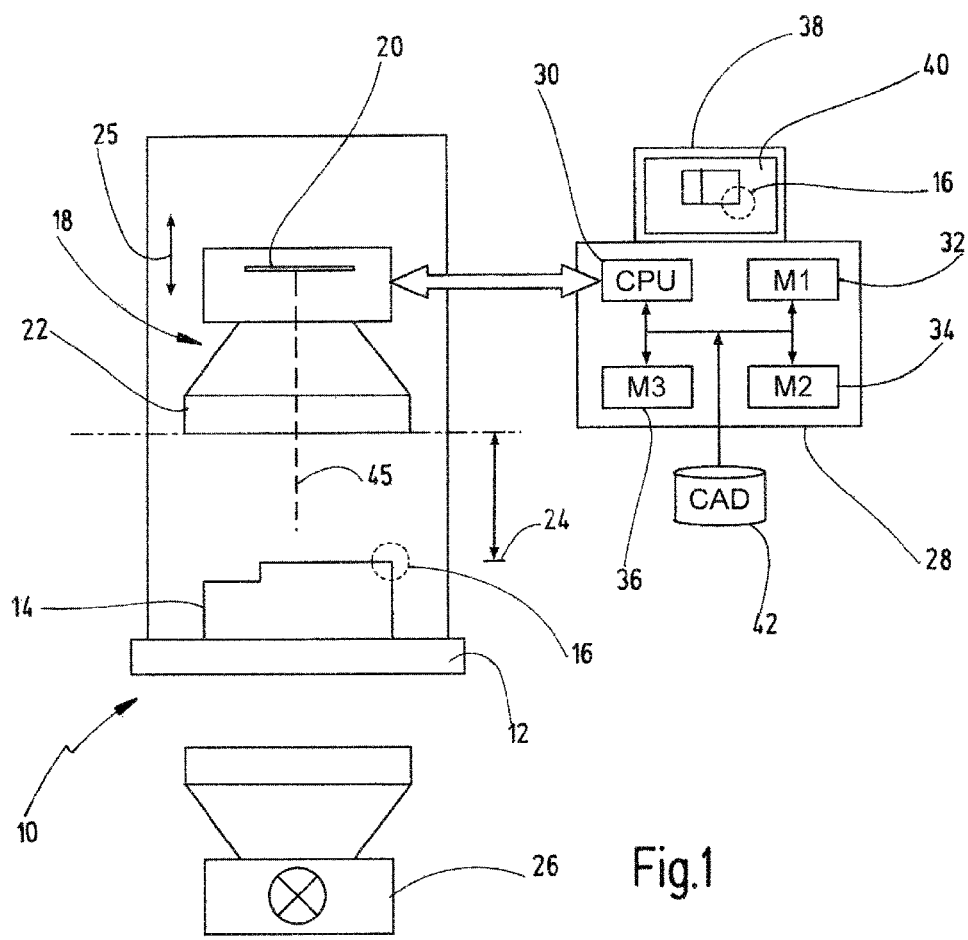
FIG. 1 shows a schematic illustration of an exemplary embodiment of the novel measuring machine.

In FIG. 1, an exemplary embodiment of the novel measuring machine as a whole is designated by reference numeral 10. The measuring machine 10 has a workpiece table 12, on which a measurement object 14 is arranged here. The reference numeral 16 designates a region of interest (ROI), in which for example an edge of the measurement object 14 extends. The intention is, for example, to measure the position of the edge and/or the edge profile.

Arranged above the workpiece table 12 is a camera 18 having an image sensor 20 and an imaging optics 22. The camera 18 thus views the measurement object 14 perpendicularly from above, which is a typical arrangement for such measuring machines. Alternatively or additionally, the camera 18 or a further camera (not illustrated here) could, however, be arranged in a different orientation relative to the measurement object.

The image sensor 20 in the preferred exemplary embodiments is a CMOS or CCD sensor having a plurality of pixels that are arranged in the manner of a matrix. The imaging optics 22 in preferred exemplary embodiments is an imaging optics that is telecentric at least on the object side. In some preferred exemplary embodiments, the imaging optics 22 is telecentric on the object side and on the image side. In principle, however, the imaging optics 22 could also be a non-telecentric imaging optics. In each case, the imaging optics 22 includes optical elements (not illustrated here), in particular lenses with which the measurement object 14 is imaged in a manner known per se onto the image sensor 20. In reality, the image is not ideal, i.e. the imaging optics 22 has aberrations that are due to its construction and/or individual aberrations, with the result that the image of the measurement object 14 recorded by the image sensor 20 deviates from the real measurement object 14. In particular, the imaging optics 22 can exhibit a focus-dependent distortion. Due to the distortion, the edge in the region of interest 16 can appear to have been shifted, rotated and/or distorted in the camera image, which is disadvantageous with respect to the measurement accuracy. For increasing the measurement accuracy, it is therefore customary to correct the image that is recorded by the image sensor 20 on the basis of (first) calibration values by way of computation. The (first) calibration values are typically determined with respect to a reference measurement object having known dimensional properties. Such a calibration of an imaging optics for measuring machines is known to experts in the field, which is why the issue is not discussed here in more detail.

As indicated by reference numeral 24, camera 18 has an adjustable working position, or an adjustable working distance 24 relative to the workpiece table 12 and the measurement object 14 arranged thereon. The working distance 24 in particular correlates with the focus setting of the imaging optics 22 on the measurement object 14. Various focus settings therefore correspond to various working positions. In some exemplary embodiments, the camera 18 can be displaced perpendicularly to the workpiece table 12, which is indicated here by way of an arrow 25. This adjustment direction is typically referred to as the Z axis. Alternatively and/or additionally, the imaging optics can have variable focus settings, which is implemented, for example, by way of lens elements which are movable relative to one another. In some exemplary embodiments, the camera 18 can additionally be displaced relative to the workpiece table 12, or the measurement object 14, within a horizontal plane, typically referred to as XY plane. In other preferred exemplary embodiments, the camera 18 and the workpiece table 12 can be arranged rigidly with respect to one another in the XY plane.

Reference numeral 26 designates an illumination unit, which in this case is arranged below the workpiece table 12. Accordingly, the workpiece table 12 is, in this exemplary embodiment, at least partially light-transmissive. The measurement object 14 is here arranged between the camera 18 and the illumination unit 26, such that the camera 18 records the workpiece 14 using what is known as transmitted-light illumination. Alternatively or additionally, the measuring machine 10 can in other exemplary embodiments have what is known as reflected-light illumination, with which the measurement object 14 is illuminated from above or at an angle with respect to the viewing direction of the camera 18.

The reference numeral 28 designates an evaluation and control unit. The evaluation and control unit 28 controls the working position of the camera 18 relative to the measurement object 14, and the image recording. In addition, the evaluation and control unit 28 permits the image evaluation and thus the determination of measurement values that represent the needed dimensional properties of the measurement object. Moreover, the evaluation and control unit 28 carries out the correction of the image recorded by the camera 18 on the basis of the (first) calibration values.

To this end, the evaluation and control unit has a processor 30 and one or more memories which are in communication with the processor 30. Illustrated by way of example is here a first memory 32, in which the first calibration values are stored that represent the individual aberrations of the imaging optics 22 for a defined working position 24. The calibration values in the memory 32 thus permit computational correction of said aberrations.

According to one preferred embodiment, measuring machine 10 has a second memory 34, in which second calibration values are stored that represent specifically the so-called image field curvature (focal plane deviation) of the imaging optics 22. The image field curvature of the camera 18 will be explained in more detail further below with reference to FIGS. 2 and 3.

Stored in a third memory 36 is here an evaluation and control program, which causes the processor 30 to carry out the control of the camera 18 and the evaluation of the recorded images. It goes without saying that memories 32, 34, 36 may be implemented as selected memory portions of a single memory chip, memory card or disk memory.

Reference numeral 38 designates a display, which represents an interface via which a user can define one or more regions of interest 16. In some exemplary embodiments, the display 38 is a touch screen monitor, and the user can specify one or more regions of interest 16 on the basis of a displayed image 40 of the measurement object 14. In some exemplary embodiments, the regions of interest can be defined on the basis of CAD data 42 that represent nominal properties of the measurement object 14. Alternatively or additionally, the display 38 can display a current image of the measurement object 14, and the user can define regions of interest 16 on the basis of the current image. It is to be appreciated that, alternatively or additionally to a touch screen monitor, operation using a mouse and/or keyboard or another input medium is possible.

In the following FIGS. 2 to 6, identical reference numerals in each case designate the same elements as in FIG. 1.

FIG. 2 shows the measurement object 14 and the camera 18 with two different working distances 24a, 24b of the camera 18 relative to the measurement object 14 and consequently with two different working positions 46a, 46b for the calibrated "best measurement plane". Furthermore, the reference numeral 44 illustrates the image field curvature of the camera 18 by way of example (and in this case in exaggerated fashion). The curve 44 indicates that the optimum focus of the imaging optics 22 is dependent on the lateral position, i.e. on the observation location within the XY plane which is perpendicular to the optical axis 45 of the imaging optics 22. By way of example, the edge in the region of interest 16a is located optimally in the focus if the camera 18 is focused on the working position 24a, whereas the edge in the region of interest 16b, which is offset laterally with respect to the region of interest 16a, is located optimally in the focus if the camera 18 is focused on the working position 24b. In neither case is the optimum focus located within the measurement plane 46a, 46b, which represents the best measurement plane on the basis of the calibration with the first calibration values in the memory 32. On the basis of the calibration with the first calibration values, in particular the distortions of the imaging optics 22 are corrected computationally for all those measurement object points that are situated in the measurement plane 46.

According to FIG. 3, the novel method and measuring machine therefore include focusing of the imaging optics 22 on a working position such that the best measurement plane 46 comes to be situated as accurately as possible at the location of the region of interest 16. In other words, the imaging optics 22 is focused in the novel method and measuring machine such that the first region of interest 16 is brought as accurately as possible to the working position for which a minimum distortion and/or a minimization of other individual aberrations is achieved on the basis of the calibration with the first calibration values. In some preferred exemplary embodiments, focusing takes place in at least two steps, as is explained below with reference to FIG. 4.

According to step 50, the novel method is preceded by a calibration of the imaging optics 22 or a calibration of the measuring machine 10. The calibration produces first calibration values, which are selected such that computational correction of a recorded image on the basis of the first calibration values provides the desired high degree of measurement accuracy for a defined working position. The aberrations of the imaging optics 22 and any further errors of the measuring machine 10 that may result, for example, from manufacturing tolerances of the mechanical guides are minimized for an image recording at the one defined working position.

According to step 52, the novel method begins with the positioning of a measurement object 14 on the workpiece table 12. Furthermore, according to step 54, 56, one or more regions of interest ROI on the measurement object 14 are defined. The regions of interest can be defined even before step 52, i.e. before the individual measurement object 14 is positioned on the workpiece table 12. As is illustrated with reference to FIG. 2, a plurality of regions of interest 16a, 16b on one measurement object 14 can be defined.

According to step 58, the imaging optics 22 is focused on the one or more regions of interest 16a, 16b. In preferred exemplary embodiments, the imaging optics 22 is focused sequentially on a plurality of possible working positions, for example by running the imaging optics 22 through its entire focusing range. In cases where the imaging optics 22 has, owing to its construction, a very large working or focusing range, it may suffice if the imaging optics 22 is focused merely through a portion of the entire working or focusing range, with this portion being selected in dependence on the previously defined regions of interest such that all regions of interest are covered.

In preferred exemplary embodiments, focusing on the one or more regions of interest 16a, 16b is automatic in that the processor 30 adjusts the camera and/or the focus setting of the imaging optics 22 relative to the measurement object incrementally sequentially and triggers an image recording at each increment. The individual focal position of the one or more regions of interest 16a, 16b can be determined in a manner known per se on the basis of a threshold value criterion between neighboring image points. Alternatively or additionally, it is possible for a user to manually focus on the one or more regions of interest 16a, 16b. Moreover, other conventional methods for determining the exact focal position of the one or more regions of interest 16a, 16b are also possible in principle.

For the sake of simplicity, it is assumed below initially that the measurement values are determined only for one region of interest 16 on the measurement object. According to step 60, the distance D (see FIG. 3) in the focal direction, i.e. parallel to the optical axis, between the optimum local focus for the selected region of interest 16 and the measurement plane 46 (BMP) that is best on the basis of the calibration is determined. The novel method and measuring machine utilize here the second calibration values from the memory 34 that represent the image field curvature 44 of the camera 18. In some exemplary embodiments, the CAD data of the measurement object 14 are used in addition, in particular if the respective distance D(n) must be determined for a plurality of regions of interest.

According to step 62, the camera 18 is subsequently refocused such that the best measurement plane 46 comes as close as possible to the region of interest 16. In some preferred exemplary embodiments, the region of interest is brought exactly into the best measurement plane 46 with the aid of the refocusing operation, as is illustrated in FIG. 3. Starting from the fact that, according to step 58, the focus was previously set optimally on the region of interest 16, the step 62 thus includes defocusing with respect to the region of interest 16. The region of interest 16 is thus removed deliberately from the optimum local focus and instead brought into the measurement plane 46 that is best on the basis of the calibration—while accepting the resulting deterioration of the local image sharpness.

In practical exemplary embodiments, this means that refocusing the camera 18 according to step 62 leads to different focal positions, depending on where a selected region of interest is located in the lateral working plane perpendicular to the optical axis 45.

According to step 64, the measuring machine 10 subsequently records an image of the measurement object in the working position that has now been found. According to step 66, the image is corrected with the aid of the first calibration values so as to minimize in particular the distortions of the imaging optics 22 before the image evaluation. According to step 68, the measurement values for the region of interest 16 are determined on the basis of the corrected image. In deviation from this, it is possible in other exemplary embodiments to first determine provisional measurement values on the basis of an uncorrected image and to subsequently correct the provisional measurement values with the aid of the correspondingly selected first calibration values.

In some exemplary embodiments, it is moreover possible according to step 70 to optionally determine the topography of the measurement object 14 using the second calibration values from the memory 34, since the different individual focal positions within the lateral working plane represent height information.

As already indicated, the novel method and measuring machine in some exemplary embodiments utilize a plurality of regions of interest, as is illustrated for example in FIG. 2. In some variants, a plurality of images are recorded according to step 64, with the refocusing according to step 62 taking place separately for a plurality of regions of interest. In these variants, it is possible to bring the plurality of regions of interest into the best measurement plane 46 each before a corresponding image is recorded and evaluated. In consequence, these variants allow a very high degree of measurement accuracy for each region of interest.

In other variants, the novel method and measuring machine utilize in each case only one image recording, i.e. a single image is recorded in step 64 and corrected according to step 66, with the measurement values for a plurality of regions of interest being determined according to step 68 on the basis of this one corrected image. In these exemplary embodiments, it is advantageous if refocusing is effected such that the best measurement plane 46 is positioned as close to all evaluated regions of interest as possible, for example is brought between the optimum local focal positions according to a best fit algorithm. In some exemplary embodiments, the best measurement plane is brought centrally (in the focal direction) between the optimum focal positions for the plurality of regions of interest.

In some exemplary embodiments, the CAD data can be advantageously used to quickly determine the second working distance from a second region of interest, after the first working distance for a first region of interest has been determined according to step 58. Furthermore, some exemplary embodiments make provision for the first working distance to be determined on the basis of CAD data of the measurement object as well. To this end, the best measurement plane can advantageously be calibrated onto the surface of the workpiece table 12.

In some exemplary embodiments, it is not only the distortions of the imaging optics 22 that are corrected on the basis of the first calibration values in step 66, but also distance-dependent telecentricity and/or distance-dependent coma and/or distance-dependent distortion, wherein the distance information (in the focal direction) is determined on the basis of the second calibration values or on the basis of the image field curvature and on the basis of the local focal positions of the regions of interest.

Figures 5, 6:
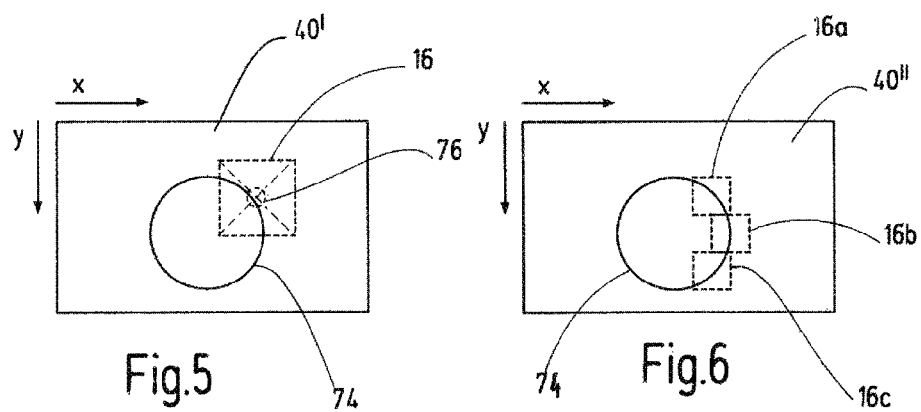
FIG. 5 shows a camera image of a measurement object, in which a first region of interest is marked.
FIG. 6 shows a further camera image with marked regions of interest.
Figure 4:
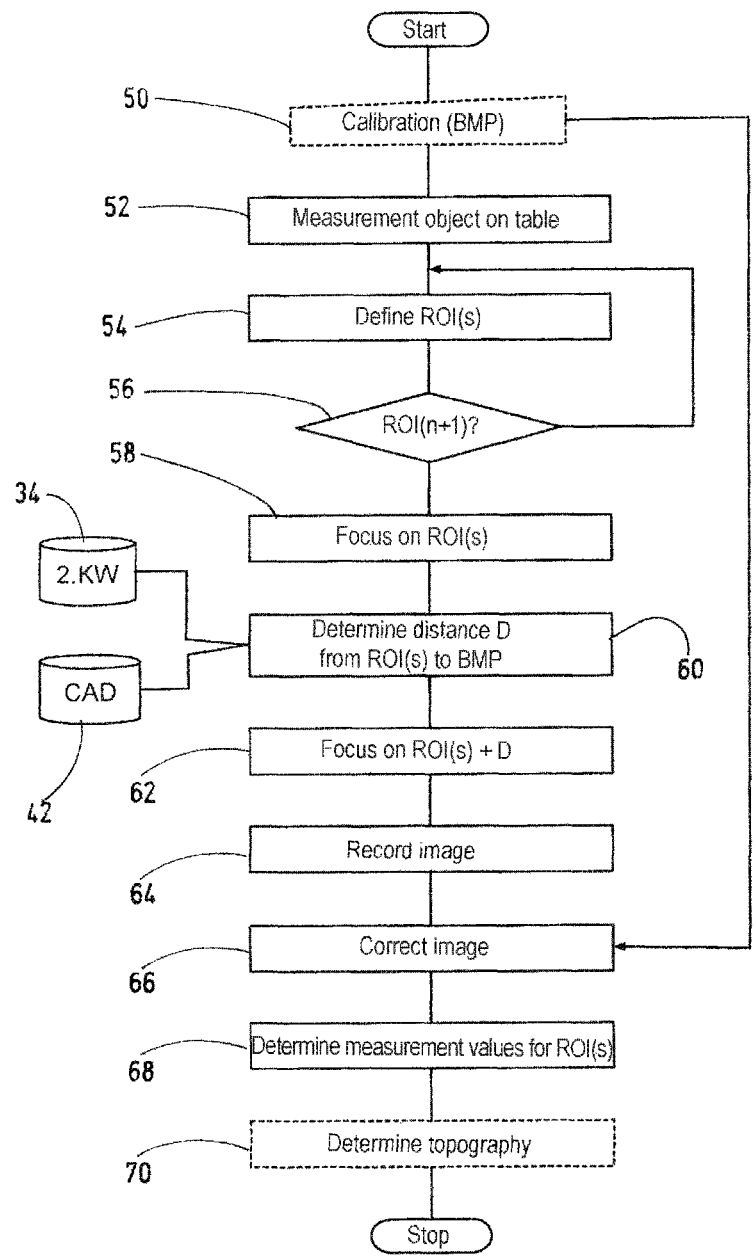
FIG. 4 shows a flowchart for elucidating an exemplary embodiment of the novel method.

FIG. 5 shows an image 40' of a measurement object having a circular edge profile 74 which borders, for example, a hole. The reference numeral 16' marks a region of interest having a square shape in this case. The region of interest 16' has an area centroid 76 and is positioned relative to the edge profile 74 such that in particular the area centroid 76 comes to lie in the region of the edge profile 74. In some preferred exemplary embodiments, focusing on the region of interest 16' according to step 58 is carried out in a targeted fashion with respect to the area centroid 76. This is particularly advantageous if an extended region of interest is defined. In some exemplary embodiments, the region of interest can have a shape that deviates from the square that is shown here, in particular a freeform. By way of example, the region of interest 16' can follow the edge profile 74 of an edge to be measured. By way of focusing on the area centroid 76, targeted refocusing is made possible even for such a region of interest, which benefits a high degree of measurement accuracy.

FIG. 6 shows a further image 40" having the edge profile 74. In this case, a plurality of regions of interest 16a, 16b, 16c are marked, which border one another and thus form segments of a common region of interest. In this exemplary embodiment, an optimum focal position for each of the plurality of regions of interest 16a, 16b, 16c is determined, and refocusing is advantageously effected in a manner such that the regions of interest 16a, 16b, 16c are each brought as close as possible to the one best measurement plane. As already mentioned above, this can be effected advantageously using a best fit algorithm. In other exemplary embodiments, the best measurement plane is brought centrally between the two focal positions that are situated closest to and furthest away from the workpiece table surface or another reference point.

What is claimed is:

1. A method for determining dimensional properties of a measurement object, comprising the steps of:
    providing an optical measuring machine comprising a workpiece table and a camera having an image sensor and an imaging optics, wherein the imaging optics exhibits aberrations and is configured to be focused on a plurality of different working positions relative to the workpiece table,
    providing first calibration values that are selected such that the aberrations are minimized for a defined working position from the plurality of different working positions,
    providing second calibration values that represent an image field curvature of the camera,
    positioning the measurement object on the workpiece table,
    defining a first region of interest on the measurement object,
    determining a first working distance of the camera to the first region of interest,
    focusing the imaging optics using the first working distance and the second calibration values such that the first region of interest is substantially brought into the defined working position,
    recording an image of the first region of interest while it substantially is in the defined working position, and
    determining measurement values that represent the dimensional properties of the measurement object in the first region of interest on the basis of the image and on the basis of the first calibration values,
    wherein the first calibration values further comprise distance-dependent correction values for correcting at least one of telecentricity errors and coma, and wherein the measurement values are determined in dependence on the first working distance and the distance-dependent correction values.

2. The method of claim 1, wherein the first calibration values effect a correction of distortion errors of the imaging optics at the defined working position.

3. The method of claim 1, wherein the imaging optics is initially focused on the first region of interest in order to determine the first working distance.

4. The method of claim 1, wherein a second region of interest on the measurement object is defined, which second region of interest is laterally spaced apart from the first region of interest, and wherein the imaging optics is focused using the second calibration values such that the first region of interest and the second region of interest each are brought as close as possible to the defined working position.

5. The method of claim 4, wherein the imaging optics is focused onto the second region of interest in order to determine a second working distance, and wherein the imaging optics is focused, using the first working distance, the second working distance and the second calibration values, so as to bring the first region of interest and the second region of interest each as close as possible to the defined working position.

6. The method of claim 4, wherein the first region of interest and the second region of interest form segments of a common region of interest.

7. The method of claim 1, wherein a CAD data set is provided, which CAD data set represents nominal dimensional properties of the measurement object, and wherein at least one of the first working distance and the second working distance is determined on the basis of the CAD data set.

8. The method of claim 1, wherein a further region of interest on the measurement object is defined, and wherein a further image of the measurement object is recorded, after the further region of interest has substantially been brought into the defined working position using the second calibration values.

9. The method of claim 1, wherein an area centroid of the first region of interest is determined, and wherein the first working distance is determined relative to the area centroid.

10. The method of claim 1, wherein a surface topography of the measurement object is determined in dependence on the second calibration values.

11. The method of claim 1, wherein the second calibration values are provided in the form of a value table comprising values each representing a spatially dependent focus shift.

12. The method of claim 1, wherein the second calibration values are provided in the form of coefficients of a spatially dependent polynomial.

13. The method of claim 12, wherein the polynomial is a Zernike polynomial.

14. The method of claim 1, wherein the second calibration values further comprise orientation-dependent contributions of the image field curvature that result from astigmatic aberrations.

15. A measuring machine for determining dimensional properties of a measurement object, comprising:
    a workpiece table,
    a camera having an image sensor and an imaging optics, wherein the imaging optics exhibits aberrations and is configured to be focused on a plurality of different working positions relative to the workpiece table, a first memory for providing first calibration values that are selected such that the aberrations are minimized for a defined working position from the plurality of different working positions, wherein the first calibration values comprise distance-dependent correction values for correcting at least one of telecentricity errors and coma, a second memory for providing second calibration values that represent an image field curvature of the camera, and an evaluation and control unit having an interface for defining a first region of interest on the measurement object, wherein the evaluation and control unit is configured for a) determining a first working distance of the camera to the first region of interest, b) focusing the imaging optics using the first working distance and using the second calibration values such that the first region of interest is brought into the defined working position, c) recording an image of the first region of interest while it is on the defined working position using the camera, and d) determining measurement values that represent the dimensional properties of the measurement object in the first region of interest on the basis of the image and on the basis of the first calibration values, wherein the measurement values are determined in dependence on the first working distance and the distance-dependent correction values.

* * * * *